(12) United States Patent
Kotak

(10) Patent No.: US 9,886,695 B2
(45) Date of Patent: Feb. 6, 2018

(54) SALES FORCE AUTOMATION SYSTEM AND METHOD FOR REAL-TIME TRAVELING SALESPERSON LOCATION TRACKING AND ACCOUNT VISIT SELECTION

(71) Applicant: salesforce.com inc., San Francisco, CA (US)

(72) Inventor: Jigar Kotak, San Francisco, CA (US)

(73) Assignee: salesforce.com inc., San Francisco, CA (US)

( * ) Notice: Subject to any disclaimer, the term of this patent is extended or adjusted under 35 U.S.C. 154(b) by 356 days.

(21) Appl. No.: 13/924,833

(22) Filed: Jun. 24, 2013

(65) Prior Publication Data

US 2014/0032261 A1  Jan. 30, 2014

Related U.S. Application Data

(60) Provisional application No. 61/676,617, filed on Jul. 27, 2012.

(51) Int. Cl.
  *G06Q 30/02* (2012.01)
  *G06Q 10/04* (2012.01)
(52) U.S. Cl.
  CPC ....... *G06Q 30/0202* (2013.01); *G06Q 10/047* (2013.01); *G06Q 30/02* (2013.01)
(58) Field of Classification Search
  None
  See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,699,255 A * | 12/1997 | Ellis et al. ................ 701/455 |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |

(Continued)

OTHER PUBLICATIONS

SalesLogix.com Web Pages Sales Logix, Apr. 2000, Retrieved from Archive.org Aug. 30, 2005.*

(Continued)

*Primary Examiner* — Leland Marcus
(74) *Attorney, Agent, or Firm* — Haynes Beffel & Wolfeld LLP; Ernest J. Beffel, Jr.

(57) ABSTRACT

The technology disclosed relates to identifying accounts and prospects nearby a salesman's location based on his real-time goal statuses and pre-assigned preferences. In particular, it relates to locating those accounts and prospects in the salesman's geographic vicinity that most likely require his attention or visit.

The technology disclosed further relates to identifying centers of influence for closing sales effort events based on one or more employee attributes. In particular, it relates to recruiting personnel that are best candidates for servicing an account or prospect considering their work profiles. It also relates to ensuring accountability in sales efforts by tracking a salesman's customer relationship management via location records.

20 Claims, 15 Drawing Sheets

(56) References Cited

U.S. PATENT DOCUMENTS

| | | |
|---|---|---|
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,529,159 B1 * | 3/2003 | Fan et al. .................. 342/357.64 |
| 6,535,909 B1 | 3/2003 | Rust |
| 6,549,908 B1 | 4/2003 | Loomans |
| 6,552,682 B1 * | 4/2003 | Fan .......................... 342/357.64 |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,819,267 B1 * | 11/2004 | Edmark ................. H04L 67/18 340/988 |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,069,497 B1 | 6/2006 | Desai |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,603,483 B2 | 10/2009 | Psounis et al. |
| 7,620,655 B2 | 11/2009 | Larsson et al. |
| 7,664,668 B2 * | 2/2010 | Lissy et al. .................. 705/7.13 |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,332,063 B2 * | 12/2012 | Moshier ................. G06Q 10/06 307/326 |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,606,611 B1 * | 12/2013 | Fedorov ................. G06Q 10/06 705/7.13 |
| 8,646,103 B2 | 2/2014 | Jakobson et al. |
| 8,660,872 B1 * | 2/2014 | Sedota et al. ................. 705/7.11 |
| 8,756,275 B2 | 6/2014 | Jakobson |
| 8,769,004 B2 | 7/2014 | Jakobson |
| 8,769,017 B2 | 7/2014 | Jakobson |
| 8,825,509 B2 * | 9/2014 | Yerkes et al. ................. 705/7.19 |
| 8,942,727 B1 * | 1/2015 | Roman et al. ............. 455/456.1 |
| 2001/0044791 A1 | 11/2001 | Richter et al. |
| 2002/0062267 A1 * | 5/2002 | Tsumura et al. ................. 705/27 |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069797 A1 * | 4/2003 | Harrison .......... G06Q 10/06311 705/7.21 |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0078788 A1 * | 4/2003 | Sussman ................. G06Q 30/02 705/1.1 |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0267592 A1 * | 12/2004 | Ogushi ................. G06Q 10/06 705/7.42 |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0222886 A1 * | 10/2005 | Sridharan ........................ 705/8 |

(56) References Cited

U.S. PATENT DOCUMENTS

| | | | |
|---|---|---|---|
| 2006/0021019 A1 | 1/2006 | Hinton et al. | |
| 2007/0050230 A1* | 3/2007 | Umagat | G06Q 30/012 705/26.2 |
| 2007/0094077 A1* | 4/2007 | Hallbauer et al. | 705/14 |
| 2007/0226048 A1* | 9/2007 | Vaillancourt et al. | 705/10 |
| 2008/0010243 A1* | 1/2008 | Weissman et al. | 707/2 |
| 2008/0086359 A1* | 4/2008 | Holton et al. | 705/10 |
| 2008/0249972 A1 | 10/2008 | Dillon | |
| 2009/0049057 A1* | 2/2009 | Ghani | G06Q 30/02 |
| 2009/0063415 A1 | 3/2009 | Chatfield et al. | |
| 2009/0100342 A1 | 4/2009 | Jakobson | |
| 2009/0157746 A1* | 6/2009 | More | G06Q 10/06 |
| 2009/0177744 A1 | 7/2009 | Marlow et al. | |
| 2010/0121673 A1* | 5/2010 | Sakaguchi | G06Q 10/06 705/7.15 |
| 2011/0218958 A1 | 9/2011 | Warshavsky et al. | |
| 2011/0230165 A1* | 9/2011 | Kleve et al. | 455/411 |
| 2011/0247051 A1 | 10/2011 | Bulumulla et al. | |
| 2012/0042218 A1 | 2/2012 | Cinarkaya et al. | |
| 2012/0233137 A1 | 9/2012 | Jakobson et al. | |
| 2012/0290407 A1 | 11/2012 | Hubbard et al. | |
| 2013/0104035 A1* | 4/2013 | Wagner | G06F 17/30241 715/240 |
| 2013/0144801 A1* | 6/2013 | Marcum et al. | 705/345 |
| 2013/0159038 A1* | 6/2013 | Fritts | G06Q 10/06311 705/7.13 |
| 2013/0212497 A1 | 8/2013 | Zelenko et al. | |
| 2013/0247216 A1 | 9/2013 | Cinarkaya et al. | |
| 2013/0290059 A1* | 10/2013 | Troiani | 705/7.19 |
| 2013/0325553 A1* | 12/2013 | Nadiadi et al. | 705/7.34 |
| 2014/0026088 A1* | 1/2014 | Monte | 715/765 |
| 2015/0371158 A1* | 12/2015 | Oberweis | G06Q 10/067 705/348 |

OTHER PUBLICATIONS

BoomTown.com web pages BoomTown, Mar. 2008, Retrieved from Archive.org Oct. 12, 2013.*

Realton—Marketing to Mobile Customers Preparation Guide Realtor.com, 2011.*

Stahl et al., Here and Now: A User-adaptive and Location Aware Task Planner International Workshop on Ubiquitous and Decentralized User Modeling, 2007.*

Leadtrack.com Web Pages LeadTrack, Mar. 2000-Feb. 2001, Retrieved from Archive.org Nov. 5, 2007.*

Pousman, Zachary et al., Design iterations for location-aware event planner Pers Ubiquit Comput, vol. 8, 2004.*

Jeng et al., WHAM: supporting mobile workforce and applications in workflow environments Proceedings Tenth International Workshop on Research Issues in Data Engineering, 2000. RIDE 2000.*

Retrieving a User's Location from GPS-Enabled Phone Developer. Salesforce.com, Jul. 17, 2010.*

Leahey, Colleen, Solving the calbe guy problem Fortune.com, Nov. 7, 2011.*

* cited by examiner

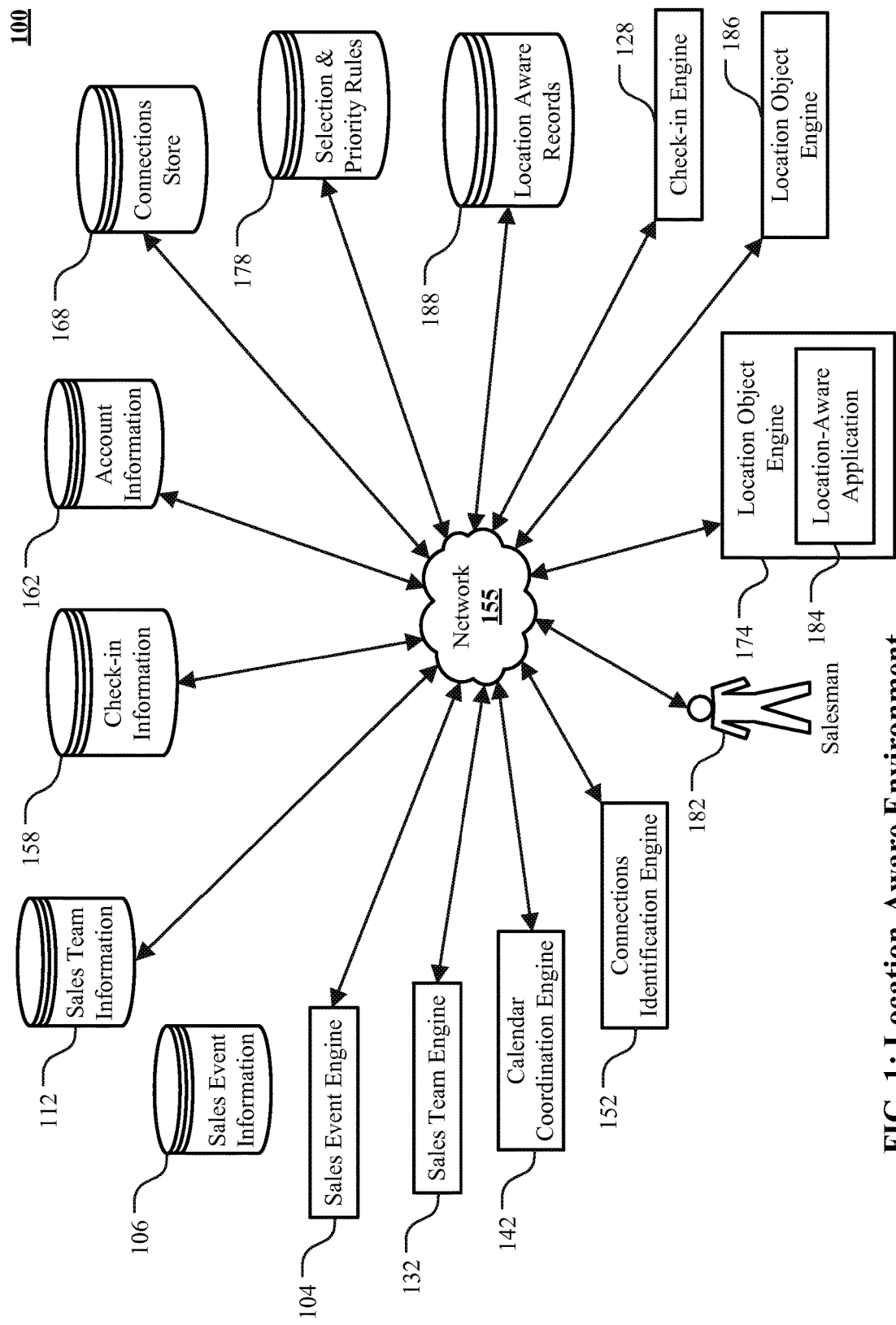
FIG. 1: Location-Aware Environment

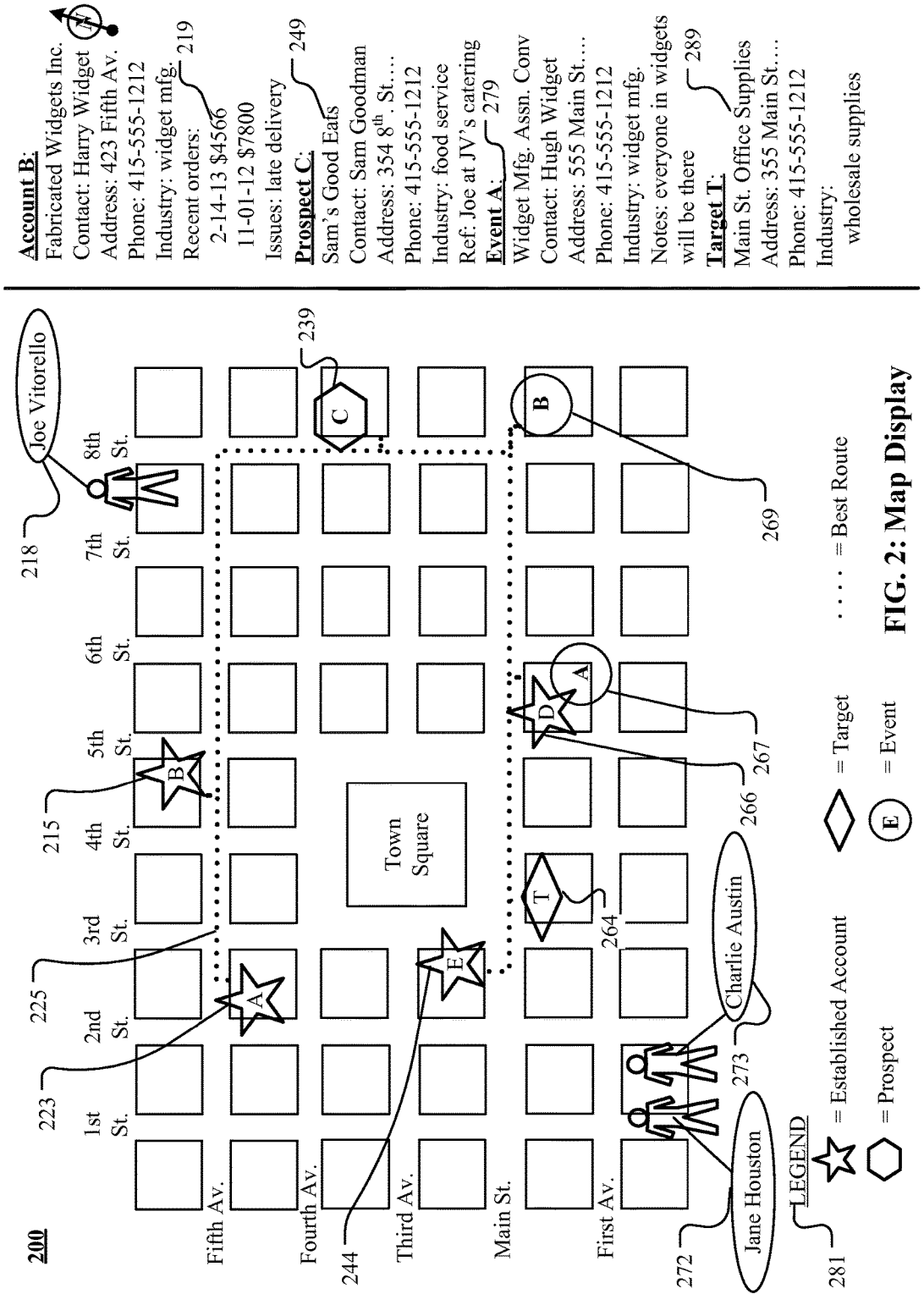
FIG. 2: Map Display

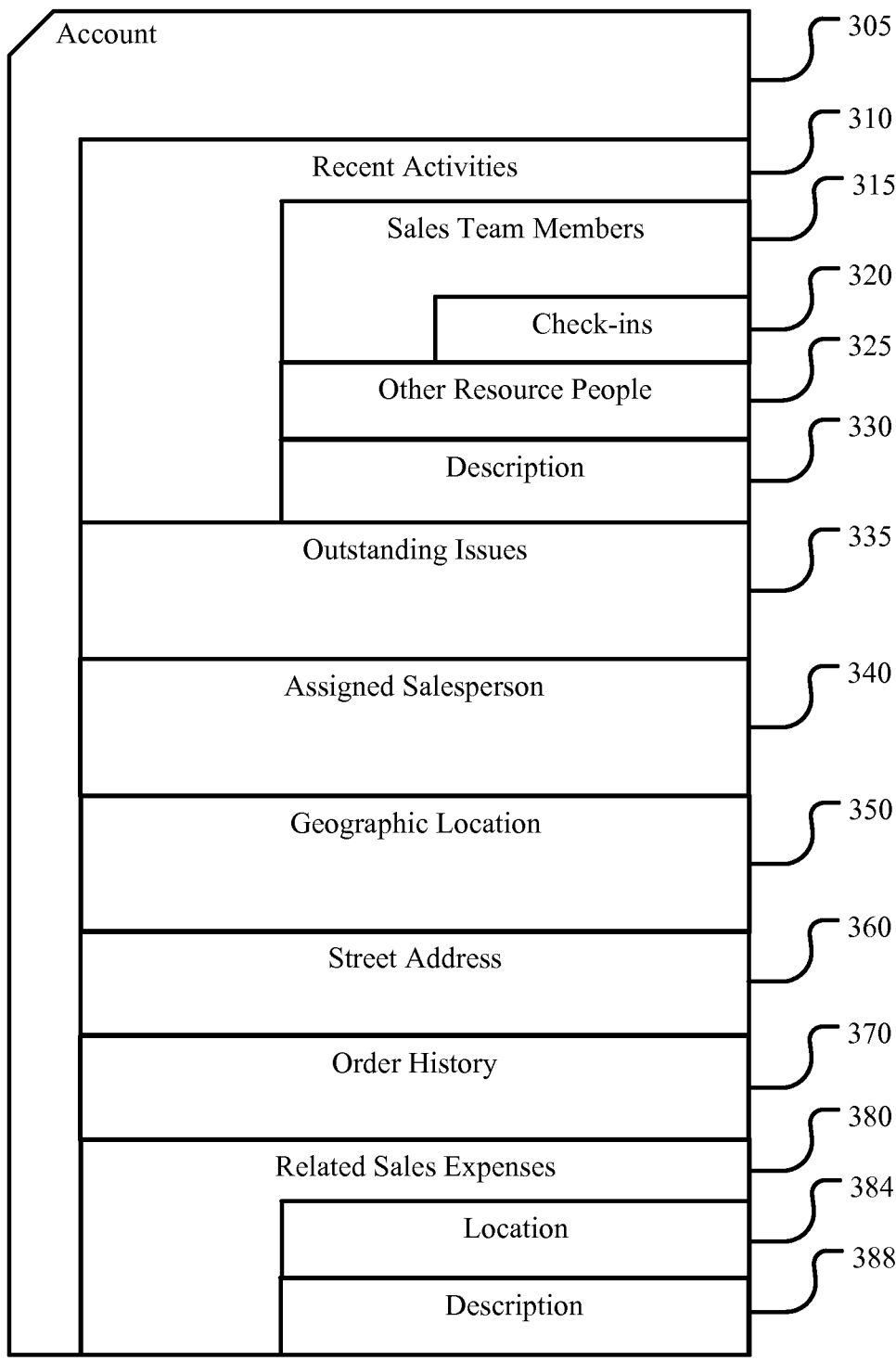
FIG. 3: Account Record

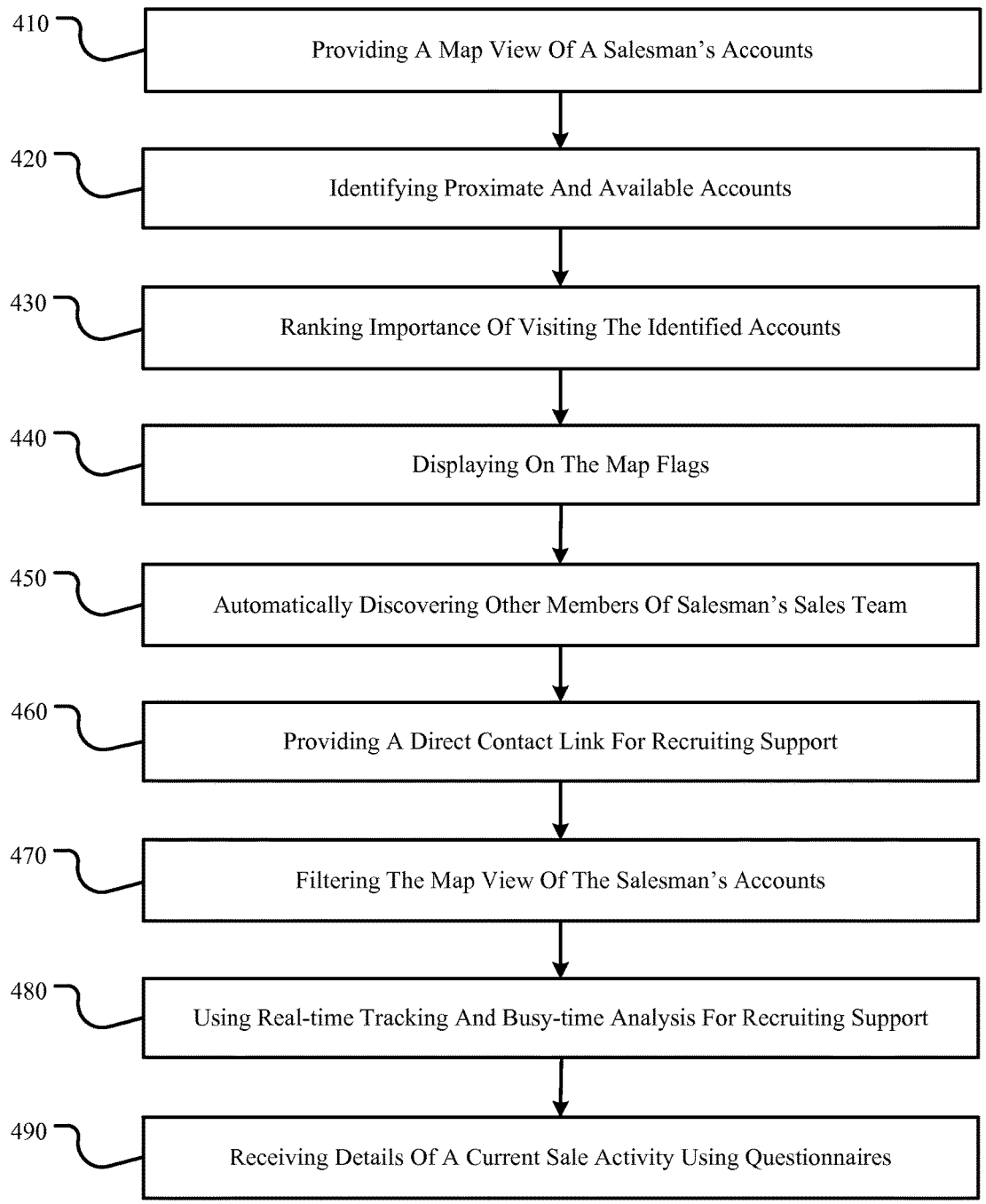
FIG. 4: Flowchart For Coordinating A Salesman's Sales Activities

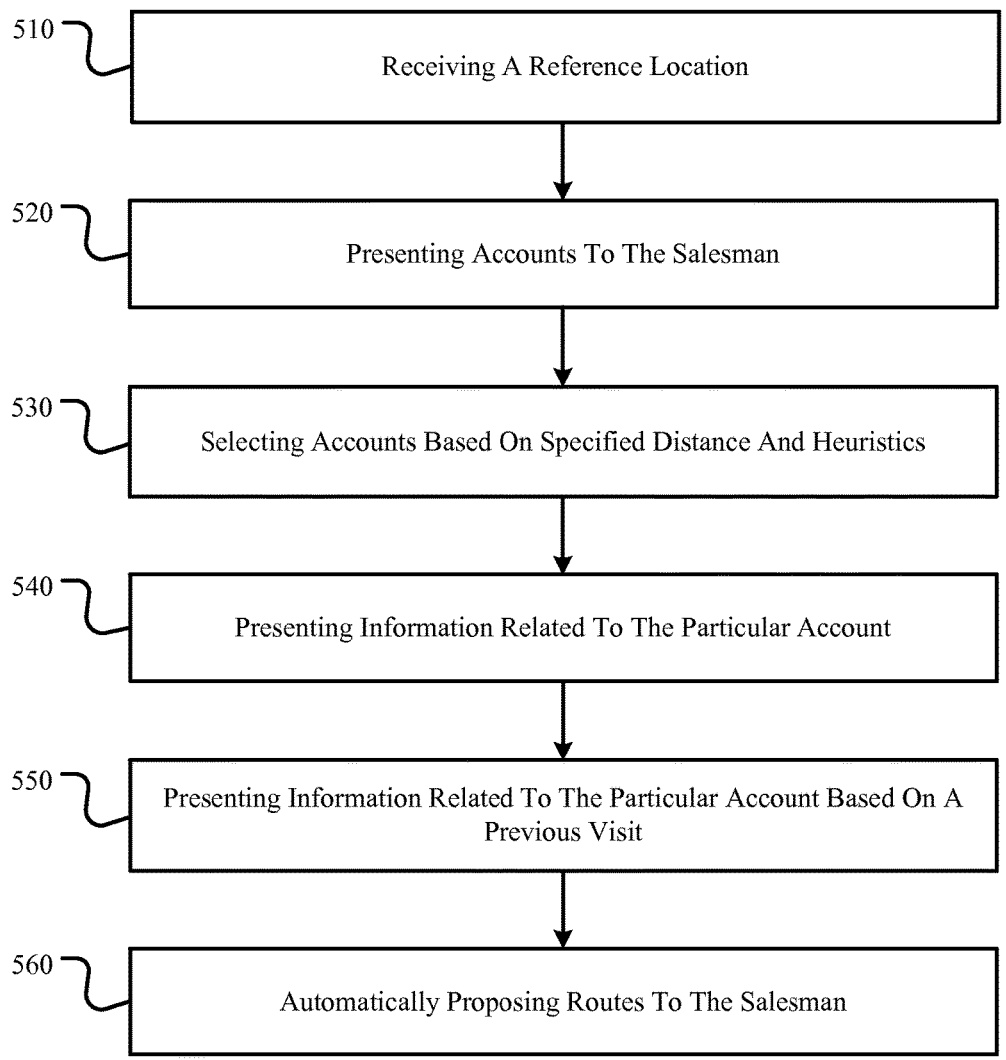
FIG. 5: Flowchart For Providing Real-time Location Based Account Information

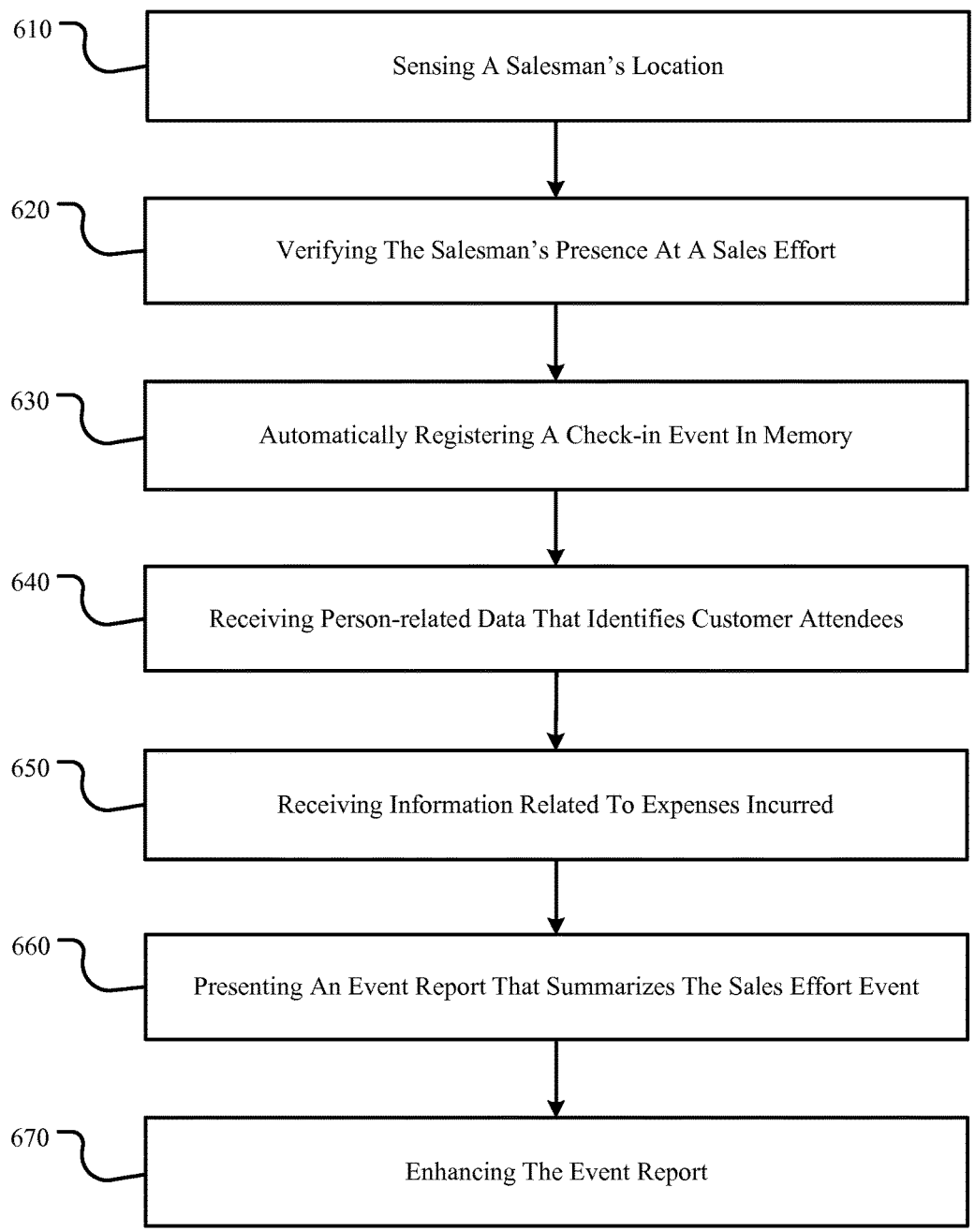
FIG. 6: Flowchart For Tracking Customer Relation Management (CRM)

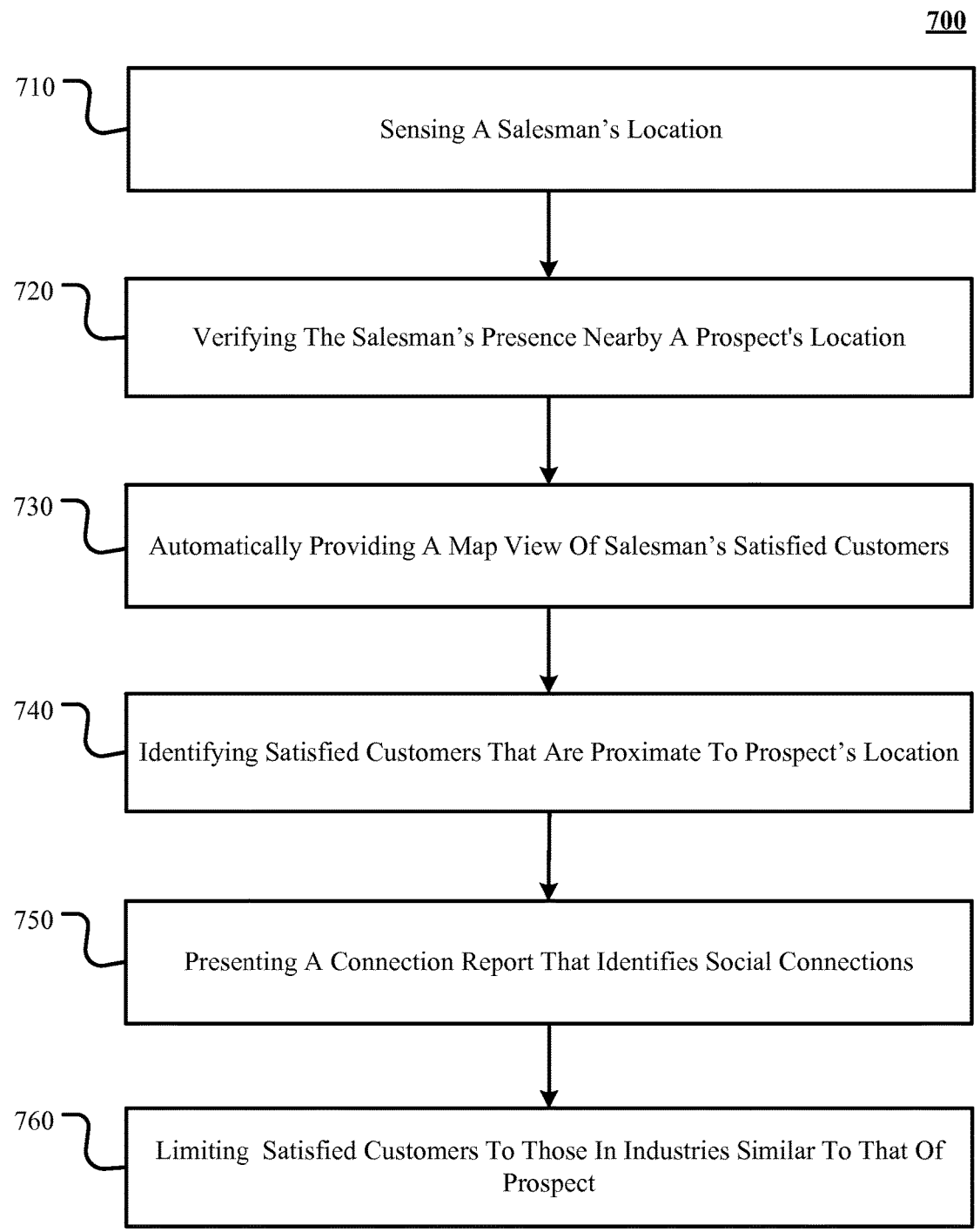
FIG. 7: Flowchart For Identifying Center Of Influences For Sales Effort Events

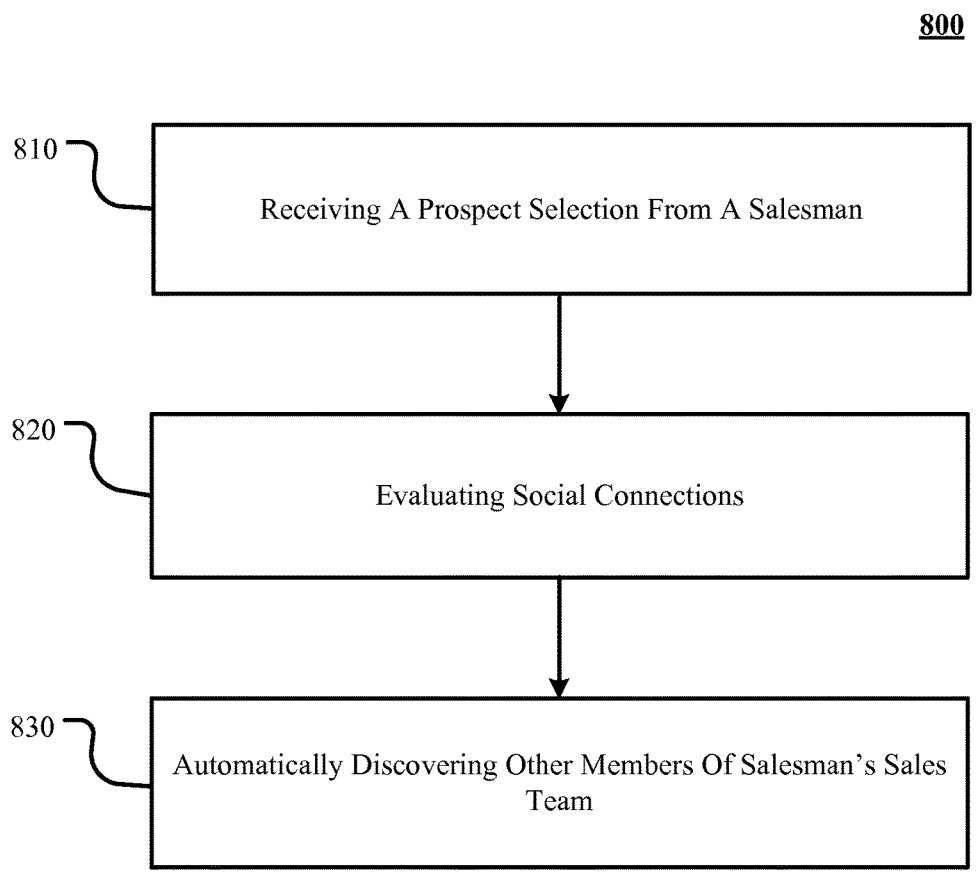
FIG. 8: Flowchart For Recruiting Participation Of Team Members

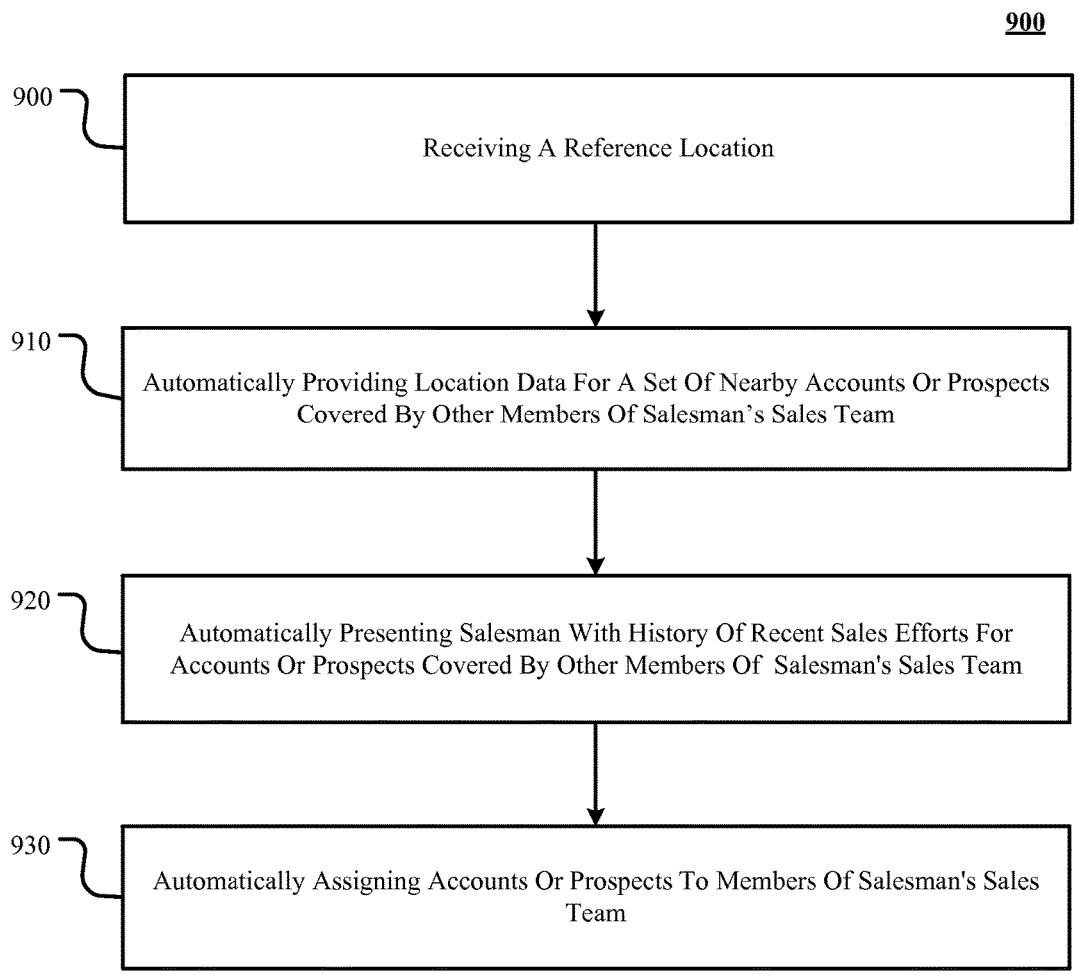
FIG. 9: Flowchart For Avoiding Repetition Of Sales Efforts By A Salesman

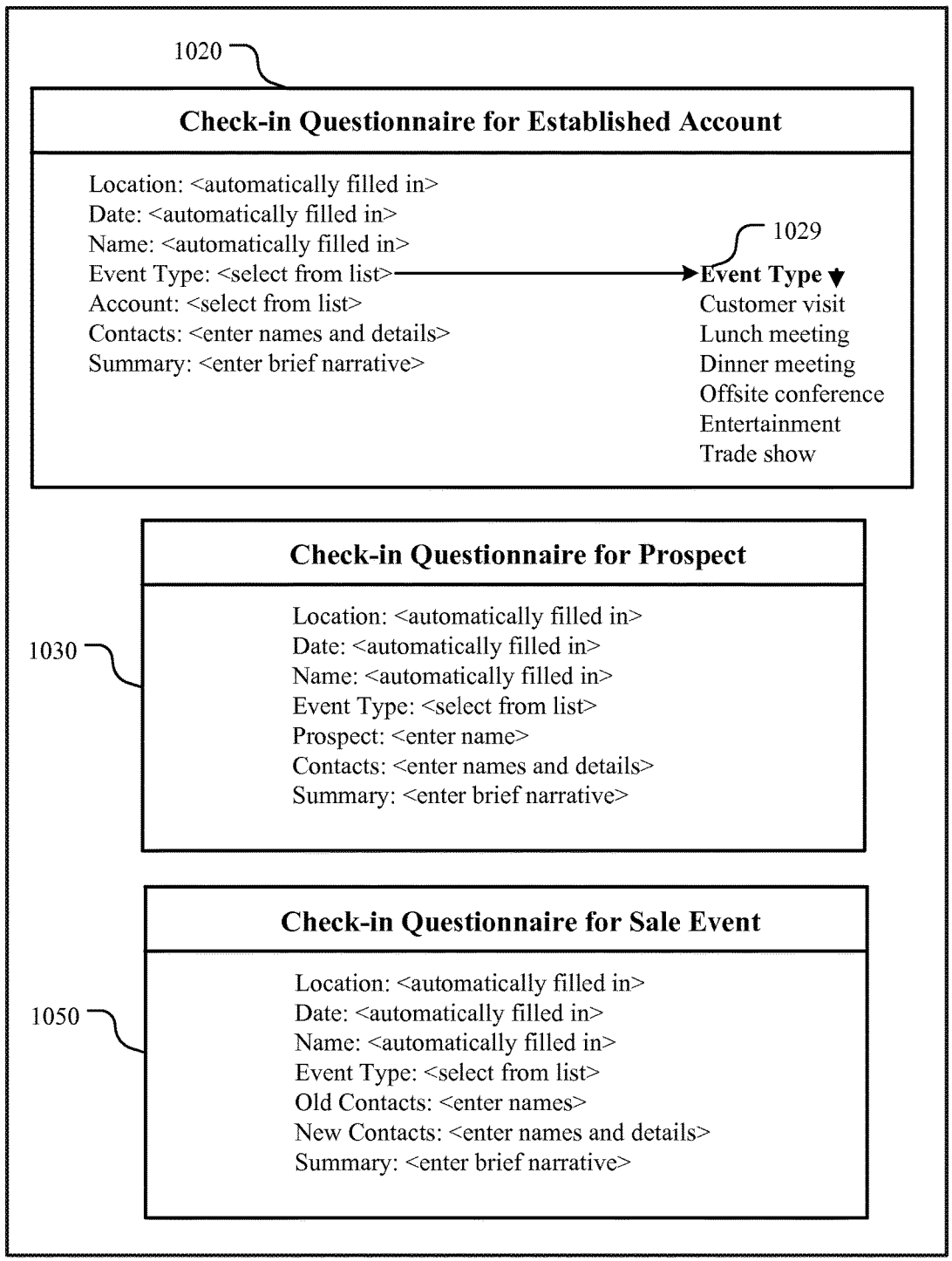
FIG. 10: Check-in Questionnaires

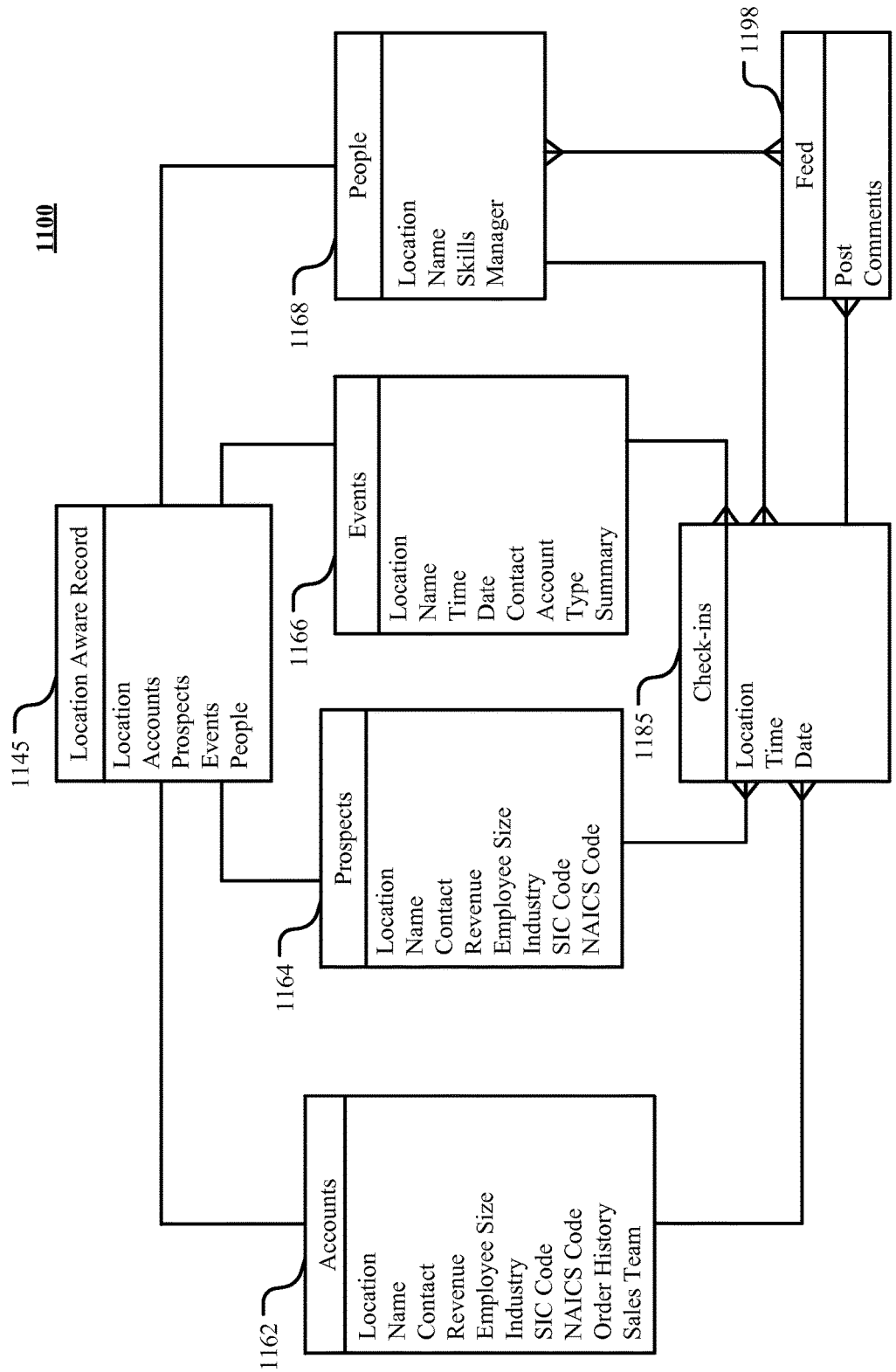
FIG. 11: Location-Aware Database Schema

1200A

```
global with sharing class LocationAwareRecords{ private List<subject> result Events = new List<subject>();
  private List<subject> resultAccounts = new List<subject>();
  private String city = '';

public PageReference getEvents() {
    resultEvents = [Select Id, Subject, Location, ActivityDateTime,ActivityDate,
IsAllDayEvent,startdatetime,enddatetime,
        DurationInMinutes, Description, Who.name, What.Name
        from Event where (location like :city) and ownerId=:UserInfo.getUserId()
and ActivityDate>
        LAST_WEEK order by ActivityDate];
    return null;
  }
  public PageReference getAccounts() {
    LocateWhere__Location_Aware_Records_Access_Permission__c setting =
LocateWhere__Location_Aware_Records_Access_Permission__c.getInstance(UserInf
o.getUserId());
    boolean allAccounts = setting.LocateWhere__All_Accounts__c;
    if(allAccounts){
      resultAccounts = [Select Id,
Name,BillingPostalCode,BillingStreet,BillingCity,BillingState, Location_Aware_Display_Image__c,Industry,LocateWhere__LAR_Latitude__c,Locat
eWhere__LAR_Longitude__c ,LocateWhere__Location_Aware_Location_History__r.Name,LocateWhere__Locatio
n_Aware_Location_History__r.CreatedDate
        from Account where ( BillingCity like :city) order by Name];
    }else{
      resultAccounts = [Select Id,
Name,BillingPostalCode,BillingStreet,BillingCity,BillingState, Location_Aware_Display_Image__c,Industry,LocateWhere__LAR_Latitude__c,Locat
eWhere__LAR_Longitude__c ,LocateWhere__Location_Aware_Location_History__r.Name,LocateWhere__Locatio
n_Aware_Location_History__r.CreatedDate
        from Account where ( BillingCity like :city) and
ownerId=:UserInfo.getUserId()
        order by Name];
    }
    return null;
  }
}
```

FIG. 12A: Code for Location-Aware Record

```
public String getCity() {                     1200B
    return city;
}
public void setCity(String n) {
    city = '%' + n + '%';
}
public String getResultEvents(){
    return getJSON(resultEvents);
}
public String getResultAccounts(){
    return getJSON(resultAccounts);
}
public String GETjson(List<sObject> records){
    String returnString = '{"returnStringSet": [';
    if (!records.isEmpty()) {
        //This is a mapping of the column names returned by the query
        Map<String, Schema.SObjectField> columns = records.getSObjectType().getDescribe().fields.getMap();
        boolean isEvent = (records.getSObjectType().getDescribe().label=='Event');
        boolean isAccount = (records.getSObjectType().getDescribe().label=='Account');
        integer i = 0;
        for (sObject c : records){
            system.debug('In for loop');
            //Now for every column in the query, I need to construct a new JSON "element"
            //I can do that statically by typing something like this
            //cjson.putOpt("'id'", new JSONObject.value(c.Id));
            returnString = returnString + '{';
            for(String columnName : columns.keySet()){
                try{
                    system.debug('In 2 for loop' + columnName);
                    //Try to get the value of the column name. If it isn't there, then it tosses
                    //an error, no big deal.

string cellVal = String.valueOf( c.get(columnName));
                    returnString = returnString + '"'+columnName+'": "'+cellVal.replace('"','\"')+'",';
                }
                catch(System.Exception ex){
                    //returnString = returnString + '"'+columnName+'": "'+ex.getMessage()+'",';
                    system.debug(ex.getMessage());
                }
            }
```

FIG. 12B: Code for Location-Aware Record

1200C

```
if(isEvent){
            Event thisEvent = (Event)records[i];
            if(thisEvent.who!=null){
               String name = thisEvent.who.name;
               returnString = returnString + '"whoname": "'+name.replace("'",'\'')+'",';
            }
            if(thisEvent.what!=null){
               String name = thisEvent.what.name;
               returnString = returnString + '"whatname": "'+name.replace("'",'\'')+'",';
            }
         }
         if(isAccount){
            Account thisAccount = (Account)c;
            if(thisAccount.Location_Aware_Location_History__r!=null &&
thisAccount.Location_Aware_Location_History__r.CreatedDate!=null){
               String checkinName =
thisAccount.Location_Aware_Location_History__r.Name;
               String checkinDate =
thisAccount.Location_Aware_Location_History__r.CreatedDate.format('MM/dd/
yyyy');
               returnString = returnString + '"locationhistoryname":
"'+checkinName.replace("'",'\'')+'",';
               returnString = returnString + '"locationhistorydate":
"'+checkinDate.replace("'",'\'')+'",';
            }
         }
         returnString = returnString.substring(0, returnString.length() - 1);
         returnString = returnString + '},';
         i++;
      }
      returnString = returnString.substring(0, returnString.length() - 1);
   }
   else{
      returnString = returnString + '';
   }
   returnString = returnString + ']}';
   return returnString ;
}
@RemoteAction
global static Account[] searchAccounts(String accountName) {
   // support * search like salesforce lookups
   accountName = '%'+accountName+ '%';
   return [SELECT id,Name FROM Account where name like :accountName];
}
```

FIG. 12C: Code for Location-Aware Record

1200D

```
@RemoteAction
    global static void createCheckInRecord(String name, String accid, String locationid) {
        LocateWhere__Location_Aware_Location_History_Junction__c lalhj = new LocateWhere__Location_Aware_Location_History_Junction__c();
        lalhj.name = name;
        lalhj.LocateWhere__Account__c = accid;
        lalhj.LocateWhere__Location_Aware_Location_History__c = locationid;
        insert lalhj;
    }

@RemoteAction
    global static String upsertLocation(String lat,string lng,String userid,String locName
) {
        LocateWhere__Location_Aware_Location_History__c lalh = new LocateWhere__Location_Aware_Location_History__c();
        lalh.LocateWhere__Latitude__c = lat;
        lalh.LocateWhere__Longitude__c= lng;
        lalh.LocateWhere__user__c = userid;
        lalh.LocateWhere__unique_id__c = lat +"+lng ;
        lalh.name = locName;
        Database.upsertResult result =
Database.upsert(lalh,LocateWhere__Location_Aware_Location_History__c.LocateWhere__unique_id__c);
        if(result.isSuccess()){
            return ''+result.getId();
        }
        return '-1';
    }

@RemoteAction
    global static void updateAccount(String accountId, String locationHistoryId) {
        Account account = new Account(id=accountId);
        account.LocateWhere__Location_Aware_Location_History__c = locationHistoryId;
        update account;
    }

@RemoteAction
    global static void createFeed(String parentId, String body) {
        FeedItem feedItem = new FeedItem();
        feedItem.parentId = parentId;
        feedItem.Body = body;
        insert feedItem;
    }
}
```

FIG. 12D: Code for Location-Aware Record

SALES FORCE AUTOMATION SYSTEM AND METHOD FOR REAL-TIME TRAVELING SALESPERSON LOCATION TRACKING AND ACCOUNT VISIT SELECTION

RELATED APPLICATION

The application claims the benefit of U.S. provisional Patent Application No. 61/676,617, entitled, "System and Method for Treating Location as an Object," filed on Jul. 27, 2012. The provisional application is hereby incorporated by reference for all purposes.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed inventions.

The technology disclosed relates to identifying accounts and prospects nearby a salesman's location based on his real-time goal statuses and pre-assigned preferences. In particular, it relates to locating those accounts and prospects in the salesman's geographic vicinity that most likely require his attention or visit.

The technology disclosed further relates to identifying centers of influence for closing sales effort events based on one or more employee attributes. In particular, it relates to recruiting personnel that are best candidates for servicing an account or prospect considering their work profiles. It also relates to ensuring accountability in sales efforts by tracking a salesman's customer relationship management via location records.

Existing location aware applications have not combined location information for salesmen, salespeople, customers, associated sales team members and events with a real-time interactive map. Such a combination can provide a salesman with desired real-time locations and details that enable them to be more effective and efficient in working with clients and fellow team members.

With widespread use of mobile technology, it has become imperative that salesmen be provided with adequate technological tools that enable them to efficiently meet their goals. Accordingly, the technology disclosed includes methods and systems that provide a flexible approach to locating entities around users based on pre-assigned attributes and take into account group dynamics and dependencies of large multi-national organizations with substantial workforce.

An opportunity arises to extend the use of location data for the benefit of sales industry. Improved salesman experience and engagement and higher customer satisfaction and retention may result.

SUMMARY

The technology disclosed relates to identifying accounts and prospects nearby a salesman's location based on his real-time goal statuses and pre-assigned preferences. In particular, it relates to locating those accounts and prospects in the salesman's geographic vicinity that most likely require his attention or visit.

The technology disclosed further relates to identifying centers of influence for closing sales effort events based on one or more employee attributes. In particular, it relates to recruiting personnel that are best candidates for servicing an account or prospect considering their work profiles. It also relates to ensuring accountability in sales efforts by tracking a salesman's customer relationship management via location records.

Other aspects and advantages of the technology disclosed can be seen on review of the drawings, the detailed description and the claims, which follow.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

FIG. 1 shows one implementation of a location-aware environment.

FIG. 2 is an example of one implementation of a map display that presents location-aware information to a salesman.

FIG. 3 illustrates one implementation of an account record.

FIG. 4 is a flow chart of one implementation for coordinating a salesman's sales activities with activities of other members of salesman's sales team.

FIG. 5 shows a flowchart of one implementation for providing real-time location based account information to a traveling salesman.

FIG. 6 is a flow chart of one implementation for tracking customer relation management (CRM) involving entertaining customers.

FIG. 7 illustrates a flowchart of one implementation for identifying centers of influence for sales effort events.

FIG. 8 shows a flowchart of one implementation for recruiting participation of team members for a sales effort event.

FIG. 9 is a flow chart of one implementation for avoiding repetition of sales efforts by a salesman.

FIG. 10 illustrates one implementation of check-in questionnaires.

FIG. 11 is an example one implementation of a location-aware database schema.

FIGS. 12A-12D are examples of working code that implements a location-aware record.

DETAILED DESCRIPTION

The following detailed description is made with reference to the figures. Sample implementations are described to illustrate the technology disclosed, not to limit its scope, which is defined by the claims. Those of ordinary skill in the art will recognize a variety of equivalent variations on the description that follows.

Location-Aware Environment

FIG. 1 illustrates an example location-aware environment 100 that includes a location object engine 186 and a salesman computing device 174 along with several other engines and database servers to build and manage location aware records 188. The environment 100 can also include a location awareness application 184 executing on a computing device 174 of salesman 182.

The environment 100 can also include an account information database 162, a calendar coordination engine 142 for scheduling meetings and events, a sales team engine 132 and accompanying sales team information database 112 to track sales team members and maintain related information, a sales event engine 104 and sales event information database 106 to manage sales events, a check-in engine 128 and check-in information database 158 to manage salesman check-ins, and a database of selection and priority rules 178 for use by the salesman in filtering what is presented for display.

In some implementations, the location-aware environment 100 can also include a communication network 155 that allows communication among the various components in the location-aware environment 100. In one implementation, the network 155 includes the Internet. The network can also utilize dedicated or private communication links that are not necessarily part of the Internet. In one implementation the network 155 uses standard communication technologies, protocols and/or inter-process communication technologies. In other implementations, location-aware environment 100 may not have the same elements or as those listed above and/or may have other/different elements instead of, or in addition to, those listed above.

In some implementations, the salesman 182 can interact with the location object engine 186 and other engines and databases through the salesman computing device 174 and location awareness application 184 running on the device. The computing device 174, the location object engine 186, calendar coordination engine 142, sales team engine 132, sales event engine 104, check-in engine 128 and database servers can include memory for storage of data and software applications, processor(s) for accessing data and executing applications, and components that facilitate communication over communications network 155.

The computing device 174 can execute the location awareness application 184 that allows the salesman to interact with the engines and database servers in the location-aware environment 100. In some implementations, this application can be a web-based or cloud-based application running on any computing device such as a personal computer, laptop computer, mobile device or any other handheld computing device. It can also be a non-social local application running in an on-premise environment. In other implementations, the location awareness application 184 can be accessed from a browser running on a computing device. The browser can be Chrome, Internet Explorer, Firefox, Safari, etc. For some platforms, a custom application adapted to a mobile device form factor may perform better than a browser.

Database servers, including multi-tenant database servers, can maintain various databases of location-aware environment 100, including account information 162, sales team information 112, sales event information 106, check-in information 158, selection and priority rules 178 and location aware records 188. In some implementations, these databases can be maintained on separate systems or aggregated onto a common system or common database. They can be centralized or distributed. In other implementations, they can be implemented using any kind of persistent memory, including rotating and solid state memories.

The location object engine 186 can receive a location reference request from computing device 174 that includes a location data transceiver coupled to the processor. In some implementations, the location object engine 186 can be repeatedly invoked for different locations. The location object engine can obtain data from a location aware records database 188. A location aware record can be retrieved from the location aware records database 188 or constructed dynamically by requesting and combining data from the account information database 162, the sales team information database 112, the sales event information database 106 and the check-in information database 158.

The information from multiple location aware records can be filtered and displayed on a map, as illustrated in FIG. 2. In some implementations, the account information database 162 can include information on prospects 239 and targets 264. In other implementations, separate databases may be maintained for these.

The calendar coordination engine 142 can operate on the calendar entries, event subscriptions, and sign-ins of salesman 182 to create or capture calendar connection events after locating a scheduled connection by finding a coincidence of scheduling in terms of time, place and date, registration or check-in information in electronic records of the salesman 182. The calendar connection events can correspond to information stored with the physical presence of the salesman 182 in time or location. If the timestamp and location recordings related to a physical presence of the salesman 182 nearby an account match the time and venue entries associated with a scheduled connection event, then the two events can be presumed to correspond to each other.

Regarding different types of connection-related data sources, access controlled APIs like Yahoo Boss, Facebook Open Graph, Twitter Firehose can provide real-time search data aggregated from numerous social media sources such as LinkedIn, Yahoo, Facebook and Twitter. Invocations to access controlled APIs by connections identification engine 152 can initialize sorting, processing and normalization of connection-related data. Public internet can provide connection-related data from public sources such as first hand websites, blogs, web search aggregators, and social media aggregators. Social networking sites can provide person-related data from social media sources such as Twitter, Facebook, LinkedIn, and Klout.

Each type of connection-related data source can be connected to network 155, which is crawled by connections identification engine 152 that searches the connection-related data sources to retrieve person-related data, including social media content and web data associated with business-to-business contacts. Finally, connections identification engine 152 can identify common connections between persons/entities based on analysis of their corresponding attributes.

In some implementations, calendar coordinate engine 142 can extract a list of contacts from a master database and search those contacts on connection-related data sources in order to determine if the contacts, customers and/or prospects are socially connected and/or have any common connections. If the sources provide positive matches to any of the contacts, customers and/or prospects, the connections identification engine 152 can store the retrieved contacts, customers and/or prospects in a connections store 168, which can be provided to the salesman before a sales effort event.

Map Display

FIG. 2 is an example of a map display that shows a salesman his sales call activities for a given area on a given day, with each activity represented by an active icon. A legend 281 shows what each icon represents. These activities may include accounts (223, 215, 244, and 266), prospects 239, targets 264 and sales events (267, 269). A recommended route 225 can be shown, based on the relative locations of the activities. Additionally, other sales team members (272, 273) and resource people 218 can be shown. In other implementations, map display 200 may not have the same screen objects or as those listed above and/or may have other/different screen objects instead of, or in addition to, those listed above.

In this example, accounts are established accounts that are assigned to the salesman. The drill down details of an account can be displayed when a salesman clicks on the account's icon. The details for account B 215 are shown as object 219 on FIG. 2. Such details can include the account name, address, contact person, phone number, industry category, a history of recent orders and any outstanding issues.

Prospects are potential accounts for which the salesman has some key information and has done some pre-qualification. In this example prospect C 239 is known to the salesman and the details display 249 includes not only the name, address and contact person but also the name of a reference, Joe Vitorello 218. Mr. Vitorello's current location is shown on the map to inform the salesman that Mr. Vitorello may be available to meet and assist the salesman when he calls on prospect C.

Targets, as indicated by object 264, may have very little detail and are similar to "cold calls." What is known about them can be displayed when their icon is activated by a mouse selection or other salesman action via screen objects on a user-interface. In this example, the name, address, phone number and industry category are shown. It is common for a salesman, while calling on an established account, to discover other potential customers as targets within the same office building or district, such as a financial district. The salesman can save the target's information and make a note to visit that target in the future.

In addition to targets, prospects and accounts, sales events can also be shown on the map as in the example shown in FIG. 2. Sales events may include activities such as tradeshows, seminars, annual sales, promotional demos, closeout and clearance sales. In some implementations, sales events can be extended to include off-site meetings, for instance lunch and dinner, and customer entertainment.

The particular target T 289, prospects and account B 219 and sales event A 279 that are shown on the map display can use the salesman's current location and time, or they can use a location supplied by the salesman for a future time and date. The real-time location of the salesman can be found using the location tracking capability of the many available mobile computing devices, particularly smartphones. Similarly, the real-time location of other sales team members and resource people can be found. These locations can all be displayed on a map for ready access by a salesman as shown in the example of FIG. 2.

In some implementations, the locations of sales activities can be changed by clicking on any of the active icons. These icons can display an editable instance of the associated location information that can be updated by the salesman. A click-and-drag operation can also be used to move the icon on the display from its current location to a new location.

Other types of interactions are also possible, depending on the particular instance of map display 200. For instance, on a touchscreen, the salesman can simply touch an icon and drag it to a new location. In some implementations, the map display 200 as an engagement console can be a computer desktop application primarily used for multi-user content engagement. The engagement console can present map display 200 into configurable "stacks" such that salesman can update locations through individual posts. These stacks can also support various filters and execution of workflow macros allowing salesman to update locations. For instance, salesman 182 can specify which locations may not be further displayed on the map display 200.

Account Record

FIG. 3 illustrates an account record 300 that can be used to store account information 305. FIG. 3 shows various fields, some of which have their own sub-fields. In other implementations, account record 300 may not have the same fields or as those listed above and/or may have other/different fields instead of, or in addition to, those listed above.

The recent activities field 310 can be used to save information related to several types of interactions between sales team members and current or potential customers. In some implementations, a sales team members sub-field 315 can be used to store the names of the sales team members present at an activity. The sales team members sub-field 315 can include its own sub-field for check-ins 320. This sub-field can be used to keep track of common details related to an activity at which a sales team member performed a check-in. Specific details may include location, date, names, type of event and so forth.

In this example, the recent activities field 310 can also include two additional sub-fields: other resource people 325 and a brief description 330. In some implementations, the other resource people field 325 can include product experts who are not part of a sales team. In other implementations, this field can include other customers who have referred a potential customer.

In some implementations, an outstanding issues field 335 can be included, as in this example, to capture important issues. Such issues can include delivery or payment problems, product quality problems, returns of unused products, etc. An assigned salesman field 340 can be used to keep track of the primary salesman responsible for an account.

In some implementations, a geographic location field 350 can be included to store a map location of an account. This map location can be given coordinates of latitude and longitude. In other implementations, a map location can be given in grid coordinates relative to a reference location. In yet other implementations, multiple geographic location fields 350 can be included for accounts having multiple locations. For instance, a geographic location may be an actual street address.

A street address field 360 can be used to save the actual street address of an account. In some implementations, the street address field 360 can be augmented by adding a mailing address field. In yet other implementations, multiple street address fields 360 can be included for accounts having multiple locations.

An order history 370 field can be included as shown in this example to provide a detailed log of previous orders placed by an account. In some implementations, this information can be used by a salesman to anticipate what products a customer may be interested in purchasing.

Expenses related to the sales process for an account may be captured in a related sales expenses field 380. Two sub-fields that may be included are shown in this example. The location field 384 can be used to store the location of a sales event and a description field 388 can be used to store a brief description of the event and relevant details. An example of this may include entertaining customers or potential customers at a dinner meeting or a club.

Coordinating Sales Activities

FIG. 4 is a flow chart 400 of one implementation for coordinating a salesman's sales activities with activities of other members of salesman's sales team. Other implementations may perform the steps in different orders and/or with different, fewer or additional steps than the ones illustrated in FIG. 4. Multiple steps can be combined in some implementations. For convenience, this flowchart is described with reference to the system that carries out a method. The system is not necessarily part of the method.

At step 410, a map view of a salesman's accounts can be provided as described in FIG. 2. The drill down details of accounts can be displayed when the salesman 182 clicks on the account's icon. The details for accounts can be shown via screen object such as 215 and 219, including account names, addresses, contacts, industry categories, a history of recent orders and any outstanding issues. In some implementations, accounts, prospect, targets, sales team members, resource people and sales events are some of the objects that may be presented for display on the map view.

The map view, at step 420, can identify accounts that are at least proximate to salesman's geographic location and are available to visit within a scheduled window of time. In some implementations, a geographic reference can be received with a default or maximum distance from the reference location using a location data transceiver. The geographic reference location and maximum distance can be used to set boundaries on the map via location object engine 174. In other implementations, the scheduled window of time can be calculated by the calendar coordination engine 142 as described in FIG. 1.

Sales event engine 104, at step 430, can rank the identified accounts according to the importance of visiting them by applying heuristics stored in account information store 162. In some implementations, the heuristics can be pre-assigned by the salesman via user selection across a user-interface. In other implementations, the heuristics can take into account at least upcoming deadlines related to the accounts, which can be provided by the sales event information store 106. In other implementations, these heuristics can be stored in selection and priority rules database 178.

At step 440, map display 200 can display one or more flags on the map that reflect recent attention to the accounts and recent issues involving the accounts such as at least recent activities by other members of salesman's sales team and recent customer relations issues from a customer relation management (CRM) system.

Sales team engine 132, at step 450, can automatically discover other members of salesman's sales team that are nearby account's geographical locations during the scheduled window of time. In some implementations, sales team members and resource people are some of the objects that may be presented for display across a user-interface. In one implementation, the location and availability of these objects can be obtained by accessing their calendars using a calendar coordination engine 142 as shown in FIG. 1.

In other implementations, location and availability of sales team members and resource people can be obtained from an account information database 162 as shown in FIG. 1. In yet other implementations, location and availability information may be entered manually. Sales team members can be sales people who belong to a designated team with specific accounts or territories. Resource people can represent individuals who can assist with the sales and support process including product experts. Resource people can also include other satisfied customers who can be potential references for the salesman.

At step 460, sales team engine 132 can further provide a direct contact link for recruiting support from the identified members in real-time. In some implementations, the direct contact link can call the identified members or send e-mails, social post or messages. In other implementations, the direct contact link can include a summary of the future sales effort events so as to provide context to the identified members.

The map view of the salesman's accounts can be filtered at step 470 based on sales effort events, check-ins and location of other members of the salesman's sales team. The location of people, including sales team members and resource people, can be obtained from tracking them via a smartphone or other device which includes a GPS and appropriate communications capability. In other implementations, their location may be obtained automatically when a salesman performs a check-in operation. In yet other implementations, their location can be selected manually. Another implementation can obtain locations of objects, including people and events, by accessing their calendars using a calendar coordination engine 142 as shown in FIG. 1. Locations for accounts, prospects and targets may be obtained from an account information database 162 as shown in FIG. 1.

Sales team engine 132, at step 480, can use real-time tracking and busy-time analysis for recruiting support from other members of the salesman's sales team. The real-time calendars and busy-time frames of other members can be stored in account information store 162.

At step 490, details of a current sale activity can be received using questionnaires. The responses to the questionnaires can summarize the current sale activity. A questionnaire may be used to capture details of a sales effort event. In some implementations, responses to the questionnaire can be automatically filled in. Location, time and date are examples of information that can be automatically entered into a questionnaire. In other implementations, a salesman's calendar can be accessed to retrieve names of people at an account, prospect or sales event. These names can then be used to automatically fill in the questionnaire.

In some implementations, answers to the questionnaires and location information can be saved in a check-in information database 158 as described in FIG. 1 accessed via the check-in engine 128. Once stored in a database, this information can be shared with other members of salesman's sales team.

Location Based Account Information

FIG. 5 shows a flowchart 500 of one implementation for providing real-time location based account information to a traveling salesman. Other implementations may perform the steps in different orders and/or with different, fewer or additional steps than the ones illustrated in FIG. 5. Multiple steps can be combined in some implementations. For convenience, this flowchart is described with reference to the system that carries out a method. The system is not necessarily part of the method.

At step 510, a reference location can be received that corresponds to a current location of a salesman via location object engine 174. In some implementations, the reference location can be obtained from tracking the salesman via a smartphone or other device which includes a GPS and appropriate communications capability. In other implementations, the reference location can be obtained automatically when a salesman performs a check-in operation. In yet other implementations, the reference location can be selected manually by the salesman.

The map display 200, at step 520, can present sales accounts to a salesman as active symbols across a user-interface. The map view can use active symbols to represent various objects as shown on the example map in FIG. 2. An active symbol can be any screen object with which a salesman can interact to effect an action. Examples of actions include displaying additional details related to the active icon, moving the icon using a click-and-drag operation, transitioning to displaying a different screen with different information, etc.

At step 530, the accounts are selected based on a specified distance from the reference location. In some implementations, a geographic reference can be received with a default or maximum distance from the reference location using a location data transceiver. The geographic reference location and maximum distance can be used to set boundaries on the map. In some implementations, the heuristics can be pre-assigned by the salesman via user selection across a user-interface. In other implementations, the heuristics can take into account at least stages at which the accounts are in salesman's sale cycle, which can be provided by the sales event information store 106. In other implementations, these heuristics can be stored in selection and priority rules database 178.

The map display 200, at step 540, can present information related to the particular account, including at least selected account's contact directory, selected account's order history, interests expressed in products and services by the selected account and time elapsed from a previous visit to the selected account. This information can be stored in the account information 162.

At step 550, the map display 200 can presenting information related to the particular account based on a previous sales efforts made by the salesman, including location of the sales efforts, date and time of the sales efforts, names of attendees at the sales efforts and description of products or services to which the sales effort was directed.

The map display 200, at step 560, can automatically propose routes to the salesman for visiting multiple selected accounts based on the specified distance from the reference location and the pre-assigned heuristics.

Tracking Customer Relation Management

FIG. 6 is a flow chart 600 of one implementation for tracking customer relation management (CRM) involving entertaining customers. Other implementations may perform the steps in different orders and/or with different, fewer or additional steps than the ones illustrated in FIG. 6. Multiple steps can be combined in some implementations. For convenience, this flowchart is described with reference to the system that carries out a method. The system is not necessarily part of the method.

At step 610, a salesman's location can be sensed via location object engine 174. In some implementations, the salesman's location can be obtained from tracking the salesman via a smartphone or other device which includes a GPS and appropriate communications capability. In other implementations, it can be obtained automatically when a salesman performs a check-in operation. In yet other implementations, the reference location can be selected manually by the salesman.

The salesman's presence at a sales effort event can be verified at step 620 by automatically linking the salesman's location to a nearby scheduled sales effort event specified in salesman's electronic calendar. The calendar connection events can correspond to information stored with the physical presence of the salesman 182 in time or location. If the timestamp and location recordings related to a physical presence of the salesman 182 nearby an account match the time and venue entries associated with a scheduled connection event, then the two events can be presumed to correspond to each other.

Check-in engine 128 can automatically register a check-in event in memory at step 630. Check-in information can be obtained automatically for sales team members and resource people via a smartphone or other device which includes a GPS and appropriate communications capability. In some implementations, their location can be obtained when they arrive at a site that is equipped with near field communication (NFC) technology or quick response (QR) codes adapted to interact with a mobile communications device. In both of these examples, a smartphone can be equipped with the requisite communications and imaging capabilities to communicate with the on-site equipment and communicate results to a remote server such as the location object engine 186 in FIG. 1.

The arrival of a sales team member and/or resource people at accounts, prospects and sales events can be detected automatically using GPS, NFC or QR codes. In some implementations, location comparisons using GPS information to ascertain that a salesman is within ten feet of an account, prospect or sales event can be performed by the location object engine 186 in FIG. 1. This verification can be used to initiate a check-in process. In other implementations, NFC and QR codes can be used to immediately detect the arrival of a sales team member or resource person at accounts, prospects and sales events. Once the arrival is detected, a check-in process can be automatically initiated.

In some implementations, a check-in request can be automatically generated when an arrival has been detected. This can be in the form of a check-in request presented to a salesman via his or her smartphone or other mobile computing and communications device. In other implementations, a check-in request can be fully automatic, providing only a short message on the device. In yet other implementations, a salesman can be presented with a prompt and a response can be requested. In yet another implementation, the check-in can proceed silently without notifying the salesman. In any of the above or other implementations, the check-in request can be delayed for a period of time or an indicator can be set to show that a check-in request is pending and that a response is awaited.

In some implementations, a check-in response can be received from a salesman. In other implementations, the check-in response can be immediately initiated after a check-in request is generated. In yet other implementations, a check-in response can be initiated in response to a salesman action such as selecting an indicator displayed on a screen of a mobile communications device. A salesman can share their check-in information with other sales team members. In some implementations, a salesman can access check-in information for other members, for instance to avoid calling on the same customer twice in the same day.

At step 640, person-related data that identifies customer attendees at the sales effort event can be received. Person-related data sources such as Facebook, Twitter, etc. can be connected to network 155, which is crawled by connections identification engine 152 that searches the person-related data sources to retrieve person-related data, including social media content and web data associated with business-to-business contacts. Finally, connections identification engine 152 can identify common connections between persons/entities based on analysis of their corresponding attributes.

Information related to expenses incurred at the sales effort event can be received at step 650. An event report can be presented at step 660 by sales event engine 104 and stored in sales event information store 106. The event report can summarize the sales effort event and enhanced at step 670 to include information such as purpose of the sales effort event, summary of discussions made at the sales effort event, list of attendees at the sales effort event, images of expense receipts, badges identifying expenses that crossed pre-assigned expense upper limits and badges specifying remaining CRM budget.

Identifying Centers of Influence

FIG. 7 illustrates a flowchart 700 of one implementation for identifying centers of influence for sales effort events. Other implementations may perform the steps in different orders and/or with different, fewer or additional steps than the ones illustrated in FIG. 7. Multiple steps can be combined in some implementations. For convenience, this flowchart is described with reference to the system that carries out a method. The system is not necessarily part of the method.

At step 710, a salesman's location can be sensed via location object engine 174. In some implementations, the salesman's location can be obtained from tracking the salesman via a smartphone or other device which includes a GPS and appropriate communications capability. In other implementations, it can be obtained automatically when a salesman performs a check-in operation. In yet other implementations, the reference location can be selected manually by the salesman.

The salesman's presence at a sales effort event can be verified at step 720 by automatically linking the salesman's location to a nearby prospect via location object engine 174. In some implementations, a geographic reference can be received with a default or maximum distance from the reference location using a location data transceiver. The geographic reference location and maximum distance can be used to set boundaries on the map using the location-aware application 184.

At step 730, a map of salesman's 182 satisfied customers can be automatically provided. The map view can identify satisfied customers that are proximate to the prospect's location at step 740. A list of salesman's satisfied customers can be stored in the account information store 162, which can be generated based on customer reviews and revenue generated.

The can connections identification engine 152 present a connection report at step 750 that identifies social connections between individuals working for the satisfied customers and the prospect connection-related data source can be connected to network 155, which is crawled by connections identification engine 152 that searches the connection-related data sources to retrieve person-related data, including social media content and web data associated with business-to-business contacts. Finally, connections identification engine 152 can identify common connections between persons/entities based on analysis of their corresponding attributes.

In some implementations, connections identification engine 152 can use statistical functions such as joint probability distribution to make probabilistic deductions about attributes of a contact, which are used to construct optimal combinations of contact attributes. These optimal combinations of contact attributes are further used to generate search queries that return more precise search results with greater recall. These search results are then used to find common contacts in the social connections of salesman's existing or satisfied customers and prospects.

In other implementations, the connection report can be limited at step 760 to include only satisfied customers that belong to industries similar to that of the prospect. For instance, salesman's 182 satisfied customers that belong to legal services industry perform the steps in different orders and/or with different, fewer or additional steps than may only be suggested as references for a law firm prospect.

Recruiting Participation of Team Members

FIG. 8 shows a flowchart 800 of one implementation for recruiting participation of team members for a sales effort event. Other implementations may the ones illustrated in FIG. 8. Multiple steps can be combined in some implementations. For convenience, this flowchart is described with reference to the system that carries out a method. The system is not necessarily part of the method.

At step 810, a prospect selection can be received from a salesman via location-aware application 184 as described in detail in FIG. 2 of this application. At step 820, social connections of other members of the salesman's sales team to individuals working for the selected prospect can be evaluated using the connections identification engine 152 as describe above in this application.

At step 830, other members of the salesman's sales team can be discovered using sales team engine 132 and sales team information 112. This discovery can include analyzing employee attributes to identify members that have successfully worked with the selected prospect based on work history of other members of the salesman's sales team, have previously worked with the selected prospect based on check-in history of other members of the salesman's sales team, are available to coordinate the sales effort event based on electronic calendars of other members of the salesman's sales team and have skills required for coordinating the sales effort event based on work profiles of other members of the salesman's sales team.

Avoiding Repetition of Sales Efforts

FIG. 9 is a flow chart 900 of one implementation for avoiding repetition of sales efforts by a salesman. Other implementations may perform the steps in different orders and/or with different, fewer or additional steps than the ones illustrated in FIG. 9. Multiple steps can be combined in some implementations. For convenience, this flowchart is described with reference to the system that carries out a method. The system is not necessarily part of the method.

At step 910, a reference location that corresponds to a current location of a salesman is received using a location object engine 186 as described above in this application.

At step 920, location data for a set of nearby accounts or prospects covered by other members of salesman's sales team can be automatically provided using the account information store 162 based on their check-in and work history as described above in this application.

At step 930, the salesman can be presented with a history of recent sales efforts for the accounts or prospects covered by other members of the salesman's sales team using the sales event engine 132 and sales event information store 106 as described above in this application.

At step 940, members of salesman's sales team can be automatically assigned accounts or prospects based on their electronic calendar and sales team information store 106 as described above in this application.

Check-In Questionnaires

FIG. 10 shows examples of check-in questionnaires 1000 used to capture important details of sales effort events. The first questionnaire can be for established accounts 1020, the second for prospects 1030 and third for sales events 1050. In the implementation shown, all three contain the same fields with the exception of contacts. For the sales event questionnaire 1050, there are two types of contacts: old contacts already known to the salesman, and new contacts who the salesman met at the event.

In some implementations, additional types of contacts may be crawled from web or various person-related data sources such as Facebook, Twitter, LinkedIn, etc. In other implementations, much of this information may be entered automatically. In yet other implementations, any or all of the information can be entered manually. In other implementations, check-in questionnaires 1000 may not have the same fields or as those listed above and/or may have other/different fields instead of, or in addition to, those listed above.

In some implementations, the time and place information can be entered automatically in the location and date fields when automatic tracking is available, for instance via a smartphone of other salesman computing and communication device 174, as shown in FIG. 1, having real-time location capability.

In some implementations, the name of the event and the event type can be found from a salesman's calendar via a calendar coordination engine as shown 142 in FIG. 1. In another implementation, the name of the event and the event type may be selected from a pre-populated list 1029.

In some implementations, when a salesman visits a known account or prospect, their name may be found automatically from a salesman's calendar, or pre-populated by using the salesman's real-time location to determine the particular account or prospect via accessing an account information database 162 as in FIG. 1. In another implementation, the salesman can select these from a pre-populated list.

In some implementations, the contact names and details can be entered by a salesman. In another implementation, this information may be pre-populated as default values obtained by accessing an account information database 162 as in FIG. 1. For the sales event questionnaire, this approach may be used for the old contacts, and the new contacts can be entered by the salesman.

In some implementations, the summary field can be entered by the salesman. In another implementation, the salesman may select a summary from a list which is standard or customized based on salesman preferences. In other implementations, the salesman may be able to enter a summary that includes voice, video or still pictures.

Each of these questionnaires can be customized to suit the needs of their salesman's by including additional fields and modifying the fields shown in these examples. These customizations can be made using custom objects of a multitenant data source (MTDS) like Salesforce.com. In such a MTDS, salesmen can be allowed to create and store custom objects, or they can be allowed to customize standard entities or objects, for example by creating custom fields for standard objects, including custom index fields.

Location-Aware Database Schema

FIG. 11 is an example database schema 1100 for a location aware record that brings together information about accounts, prospects, events and people. The classes in the schema are shown as blocks, with the name of the class at the top portion of each block. The main portion of each block contains the class members. The classes in this schema are equivalent to tables in a relational database with the class members being equivalent to fields. In the implementation shown in this example, several members are shown for each class. In another implementation, other information may be included by modifying the fields shown and adding additional ones. In other implementations, database schema 1100 may not have the same fields or as those listed above and/or may have other/different elements instead of, or in addition to, those listed above.

FIG. 11 shows an implementation in which a location aware record 1145 can include location as a common key, and is associated with four classes: accounts 1162, prospects 1164, events 1166 and people 1168. In another implementation, these relations can be changed or augmented by adding additional classes. For instance, location aware records 1145 can be directly associated with check-ins 1185. All of these classes include location as a common key. In some implementations, location can be stored as a street address. In other implementations, location can be augmented by storing a geographic location such as longitude and latitude.

In one implementation, the accounts 1162 and prospects 1164 tables (classes) shown in this example include several common fields. The accounts 1162 table shown contains two additional fields: the order history and the sales team. There is no order history for a prospect and a sales team may not be assigned until a prospect has placed an order. In another implementation, the prospects table 1164 can be included as part of the accounts table simply by leaving the order history field empty. In yet another implementation, this can be accomplished by adding a status field to the accounts class, where the status indicates that the customer is a prospect or an established account.

The name and contact fields in the accounts table 1162 and the prospects table 864 can contain the name of the customer and the name of the person with whom a salesman interacts. In other implementations, the contact field may contain multiple names.

The revenue field in the accounts table 1162 and the prospects table 1164 may be used to indicate the annual revenue of the account or prospect. Similarly, the employee size field can include the number of employees at the account or prospect.

The industry, SIC code and NAICS code fields in the accounts table 1162 and the prospects table 1164 all indicate what type of industry is associated with an account or prospect. For instance, a commercial bank can be shown as in the banking industry with an SIC (Standard Industrial Classification) code of 6021 and a NAICS (North American Industry Classification System) code of 52210. Other implementations may use different or additional industry classification systems, including GICS (Global Industry Classification Standard), or ICB (Industry Classification Benchmark).

The events table 1166 is intended to capture details of an event which are important to a salesman. In one implementation it is associated with a check-ins table which can allow it to access, for instance, all the people who checked-in at the event. In another implementation it can be adapted to access account and prospect information in addition, as shown in FIG. 11.

The events table 1166 can include a name field for an event. In some cases, such as a lunch meeting with a client, this field may be left blank and in others such as conventions, the name of the event can be entered.

The time and date in the events table can be captured in their respective fields either manually or automatically during a check-in. In some implementations, the contact name or names can be entered manually and in other implementations they may be obtained automatically via a salesman's calendar using a calendar coordination engine 142 as shown in FIG. 1. Similarly, account information can be obtained automatically in some implementations using location based automatic check-in information, or in other implementations using a salesman's calendar via a calendar coordination engine 142 as shown in FIG. 1.

In one implementation, the event type for the events table 1166 can be found from a salesman's calendar via a calendar coordination engine as shown 142 in FIG. 1. In another implementation, the name of the event and the event type may be selected from a pre-populated list 1029 as shown in FIG. 10.

In one implementation, the summary field for the events table 1166 can be entered by the salesman. In another implementation, the salesman may select a summary from a list which is standard or customized based on salesman preferences. In other implementations, the salesman may be able to enter a summary that includes voice, video or still pictures.

The people table 1168 in this example shows a person's name, their skills and their manager. In one implementation, this information can be used internally within a sales organization for members of that sales organization. In another implementation, this information can be used by a salesman to obtain the names of a person's manager in order to escalate a sales process higher in a customer's organization. In yet another implementation, the skills information contained in the skills field can be used by a salesman to find people having skills that can be used in facilitating a sale.

The check-ins table 1185 in the implementation shown in this example is used to associate accounts, prospects, events and people with each other. Three fields are shown in this example: location, date and time. In one implementation, a salesman can obtain all the check-ins for an account to find out if any colleagues have visited the account recently. In another implementation, a salesman can obtain information for all the prospects or people who attended an event.

The feed table 1198 is included in this example schema to illustrate how additional information may be easily added to a location aware record by allowing a salesman to post comments after checking in at an event, account or prospect. For instance, a salesman at a convention may have attended a demonstration of an important product and wish to alert his sales team to this information. In some implementations, a social networking too such as Twitter could be used. In other implementations, the feed could be maintained using an internal networking application on a mobile communications device such as a smartphone.

Code for Location-Aware Record

FIGS. 12A-12D are extracts of working code that implement a location aware record that can be used to populate a display as shown in FIG. 2 with information related to accounts and events. The main class LocationAwareRecords is declared at the top of FIG. 12A. Event information can be obtained by using the getEvents( ) function and account information can be obtained by calling the getAccounts( ) function. FIG. 12B and FIG. 12C include code used to implement these functions. Latitude and longitude, as well as street address information can be used as shown to obtain LocationAwareRecords for a given location.

FIG. 12D includes the function createCheckInRecord( ) which creates and inserts check-in information into a database. Location information can be updated and inserted using the upsertLocation( ) function. The updateAccount( ) function can be used to create a new account entry in a database. The function createFeed( ) can be used to post a new feed.

Particular Implementations

In one implementation, the technology disclosed can include a method for coordinating a salesman's sales activities with activities of other members of salesman's sales team. The method includes providing a map view of a salesman's accounts, wherein the map view identifies accounts that are at least proximate to salesman's geographic location and available to visit within a scheduled window of time.

The technology disclosed also includes ranking importance of visiting the identified accounts by applying pre-assigned heuristics that take into account at least upcoming deadlines related to the accounts. It further includes displaying on the map flags that reflect recent attention to the accounts and recent issues involving the accounts, including at least recent activities by other members of salesman's sales team and recent customer relations issues from a customer relation management (CRM) system. automatically discovering other members of salesman's sales team that are nearby accounts' geographical locations during the scheduled window of time and providing a direct contact link for recruiting support from the identified members in real-time.

This method and other implementations of the technology disclosed can each optionally include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations such as location-aware environment, map display, coordinating sales activities, etc.

The method further includes filtering the map view of the salesman's accounts based on sales efforts, check-ins and locations of other members of the salesman's sales team. It includes using real-time tracking and busy-time analysis for recruiting support from other members of the salesman's sales team. It also includes receiving details of a current sale activity using questionnaires, wherein responses to the questionnaires summarize the current sale activity.

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

In another implementation, a method is described for providing real-time location based account information to a traveling salesman. The method includes receiving a reference location that corresponds to a current location of a salesman and presenting accounts to the salesman as active symbols on a map across a salesman-interface. The accounts can be selected based on a specified distance from the reference location in combination with pre-assigned heuristics that take into account stages at which the accounts are in salesman's sale cycle. In response to salesman's selection of a particular account across the salesman-interface, the technology disclosed can present information related to the particular account, including at least selected account's contact directory, selected account's order history, interests expressed in products and services by the selected account and time elapsed from a previous visit to the selected account.

This method and other implementations of the technology disclosed can each optionally include one or more of the following features and/or features described in connection with additional methods disclosed.

The method further includes presenting information related to the particular account based on a previous sales efforts made by the salesman, including at least location of the sales efforts, date and time of the sales efforts, names of attendees at the sales efforts and description of products or services to which the sales effort was directed.

The method also includes automatically proposing routes to the salesman for visiting multiple selected accounts based on the specified distance from the reference location and the pre-assigned heuristics.

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

In yet another implementation, the technology disclosed can include a method for tracking customer relation management (CRM) involving entertaining customers. The method includes sensing a salesman's location and verifying the salesman's presence at a sales effort event by automatically linking the salesman's location to a nearby scheduled sales effort event specified in salesman's electronic calendar. It also includes automatically registering a check-in event in memory. It further includes receiving person-related data that identifies customer attendees at the sales effort event receiving information related to expenses incurred at the sales effort event. In response to salesman selection across a salesman interface, the technology disclosed can present an event report that summarizes the sales effort event.

This method and other implementations of the technology disclosed can each optionally include one or more of the following features and/or features described in connection with additional methods disclosed.

The method further includes enhancing the event report to at least include purpose of the sales effort event, summary of discussions made at the sales effort event, list of attendees at the sales effort event, images of expense receipts, badges identifying expenses that crossed pre-assigned expense upper limits and badges specifying remaining CRM budget.

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

In yet another implementation, a method is described for identifying centers of influence for sales effort events. The method includes sensing a salesman's location and verifying the salesman's presence nearby a prospect's location by automatically linking the salesman's location to a prospect record, automatically providing a map view of salesman's satisfied customers. The map view identifies satisfied customers that are proximate to the prospect's location. In response to salesman selection across a salesman interface, the technology disclosed can present a connection report that identifies social connections between individuals working for the satisfied customers and the prospect.

This method and other implementations of the technology disclosed can each optionally include one or more of the following features and/or features described in connection with additional methods disclosed.

The method also includes limiting the satisfied customers to those in industries similar to that of the prospect.

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

In yet another implementation, the technology disclosed can include a method for recruiting participation of team members for a sales effort event. The method can include receiving a prospect selection from a salesman who may be a member of a sales team. It can include evaluating social connections of other members of the salesman's sales team to individuals working for the selected prospect. It can further include discovering other members of the salesman's sales team that have successfully worked with the selected prospect based on work history of other members of the salesman's sales team, have previously worked with the selected prospect based on check-in history of other members of the salesman's sales team, are available to coordinate the sales effort event based on electronic calendars of other members of the salesman's sales team and have skills required for coordinating the sales effort event based on work profiles of other members of the salesman's sales team.

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

In yet another implementation, a method is described for avoiding repetition of sales efforts by a salesman. The method includes receiving a reference location that corresponds to a current location of a salesman. It can include automatically providing location data for a set of nearby accounts or prospects covered by other members of salesman's sales team. It can further include automatically presenting the salesman with a history of recent sales efforts for the accounts or prospects covered by other members of the salesman's sales team.

This method and other implementations of the technology disclosed can each optionally include one or more of the following features and/or features described in connection with additional methods disclosed.

The method also includes automatically assigning accounts or prospects to members of salesman's sales team.

While the present invention is disclosed by reference to the preferred implementations and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

The invention claimed is:

1. A method for providing real-time location based account information to a traveling salesperson, the method including:

automatically implementing a continuous tracking, by a location object server, of a plurality of reference locations of a plurality of traveling salespersons including a first traveling salesperson and a second traveling salesperson using a global position system (GPS) in communication with a plurality of devices including a device equipped with GPS sensor of the first traveling salesperson and a device equipped with GPS sensor of the second traveling salesperson;

identifying, using the location object server, location aware records relevant to the first traveling salesperson, proximate to a tracked reference location of the first traveling salesperson, wherein the location aware records specify at least account information of the traveling salespersons;

selecting by the location object server a traveling salesperson to direct to visit an account based upon which traveling salesperson visited the account in connection with accomplishing a sales cycle milestone in a sales cycle relating to the account based on a specified distance from the tracked reference location of the first traveling salesperson in combination with pre-assigned heuristics stored in a selection and priority rules database that take into account stages at which one or more accounts are in a traveling salesperson's sale cycle applied to the tracked reference location of the first traveling salesperson and a tracked reference location of the second traveling salesperson, the pre-assigned heuristics including businesses that are accounts of the first and second traveling salespersons; and receiving by the location object server over a network an interactive map provided by a location aware application hosted by a first database server and causing display, in a same page within a traveling salesperson's customer relationship management (CRM) application hosted by a second database server distinct from the first database server, of the interactive map overlaid with active symbols that present at least near real time information related to a particular account based on a previous sales effort made by the traveling salesperson automatically generated by the location object server that represent at least some of the identified location aware records based on the combination of the specified distance and the pre-assigned heuristics, thereby preventing the traveling salesperson from:

using the device equipped with GPS receiver to access the interactive map outside the CRM application;

using the device equipped with GPS receiver to access the account information via the CRM application; and based upon salesperson selection of an account, the selection received from the device of a salesperson, presenting information related to the selected account, including at least a selected account's contact directory, selected account's order history, interests expressed in products and services by the selected account, and time elapsed from a previous visit to the selected account.

2. The method of claim 1, further including presenting wherein the information related to a particular account based on a previous sales efforts made by the traveling salesperson, further includes at least location of the previous sales efforts;
date and time of the previous sales efforts;
names of attendees at the previous sales efforts; and
description of products or services to which the previous sales efforts was directed.

3. The method of claim 1, further including automatically proposing routes to the traveling salesperson for visiting multiple selected accounts based on the specified distance from a reference location and the pre-assigned heuristics.

4. The method of claim 1, further including filtering the interactive map of a traveling salesperson's accounts based on sales efforts, check-ins and locations of other members of a traveling salesperson's sales team.

5. The method of claim 1, further including using real-time tracking and busy-time analysis for recruiting support from other members of a traveling salesperson's sales team.

6. The method of claim 1, further including receiving details of a current sale activity using questionnaires, wherein responses to the questionnaires summarize the current sale activity.

7. The method of claim 1, further including discovering other members of a traveling salesperson's sales team that have successfully worked with a selected prospect based on work history of other members of the traveling salesperson's sales team;

have previously worked with the selected prospect based on check-in history of other members of the traveling salesperson's sales team;

are available to coordinate a sales effort event based on electronic calendars of other members of the traveling salesperson's sales team; and have skills required for coordinating the sales effort event based on work profiles of other members of the traveling salesperson's sales team.

8. The method of claim 1, further including automatically providing location data for a set of nearby accounts or prospects covered by other members of traveling salesperson's sales team.

9. A non-transitory computer-readable storage medium storing instructions for providing real-time location based account information to a traveling salesperson, the instructions which when executed by a processor cause the processor to perform operations including:

automatically implementing a continuous tracking, by a location object server, of a plurality of reference locations of a plurality of traveling salespersons including a first traveling salesperson and a second traveling salesperson using a global position system (GPS) in communication with a plurality of devices including a device equipped with GPS sensor of the first traveling salesperson and a device equipped with GPS sensor of the second traveling salesperson;

identifying, using the location object server, location aware records relevant to the first traveling salesperson, proximate to a tracked reference location of the first traveling salesperson, wherein the location aware records specify at least account information of the traveling salespersons;

selecting by the location object server a traveling salesperson to direct to visit an account based upon which traveling salesperson visited the account in connection with accomplishing a sales cycle milestone in a sales cycle relating to the account based on a specified distance from the tracked reference location of the first traveling salesperson in combination with pre-assigned heuristics stored in a selection and priority rules database that take into account stages at which one or more accounts are in a traveling salesperson's sale cycle applied to the tracked reference location of the first traveling salesperson and a tracked reference location of the second traveling salesperson, the pre-assigned heuristics including businesses that are accounts of the first and second traveling salespersons; and receiving by the location object server over a network an interactive map provided by a location aware application hosted by a first database server and causing display, in a same page within a traveling salesperson's customer relationship management (CRM) application hosted by a second database server distinct from the first database server, of the interactive map overlaid with active symbols that present at least near real time information related to a particular account based on a previous sales effort made by the traveling salesperson automatically generated by the location object server that represent at least some of the identified location aware records based on the combination of the specified distance and the pre-assigned heuristics, thereby preventing the traveling salesperson from:
using the device equipped with GPS receiver to access the interactive map outside the CRM application;
using the device equipped with GPS receiver to access the account information via the CRM application; and
based upon salesperson selection of an account, the selection received from the device of a salesperson, presenting information related to the selected account, including at least a selected account's contact directory, selected account's order history, interests expressed in products and services by the selected account, and time elapsed from a previous visit to the selected account.

10. The non-transitory computer-readable storage medium of claim 9, further including instructions that cause the processor to perform:
providing information related to a particular account based on a previous sales efforts made by the traveling salesperson, including at least:
location of the previous sales efforts;
date and time of the previous sales efforts;
names of attendees at the previous sales efforts; and
description of products or services to which the previous sales efforts was directed.

11. The non-transitory computer-readable storage medium of claim 9, further including instructions that cause the processor to perform:
automatically determining routes to propose to the traveling salesperson for visiting multiple selected accounts based on the specified distance from a reference location and the pre-assigned heuristics.

12. The non-transitory computer-readable storage medium of claim 9, further including instructions that cause the processor to perform:
filtering data provided for presenting the interactive map of a traveling salesperson's accounts based on sales efforts, check-ins and locations of other members of a traveling salesperson's sales team.

13. The non-transitory computer-readable storage medium of claim 9, further including instructions that cause the processor to perform:
using real-time tracking and busy-time analysis for recruiting support from other members of a traveling salesperson's sales team.

14. The non-transitory computer-readable storage medium of claim 9, further including instructions that cause the processor to perform:
receiving details of a current sale activity using questionnaires, wherein responses to the questionnaires summarize the current sale activity.

15. The non-transitory computer-readable storage medium of claim 9, further including instructions that cause the processor to discover other members of a traveling salesperson's sales team that:
have successfully worked with a selected prospect based on work history of other members of the traveling salesperson's sales team;
have previously worked with the selected prospect based on check-in history of other members of the traveling salesperson's sales team;
are available to coordinate a sales effort event based on electronic calendars of other members of the traveling salesperson's sales team; and
have skills required for coordinating the sales effort event based on work profiles of other members of the traveling salesperson's sales team.

16. The non-transitory computer-readable storage medium of claim 9, further including instructions that cause the processor to automatically provide location data for a set of nearby accounts or prospects covered by other members of traveling salesperson's sales team.

17. A system for providing real-time location based account information to a traveling salesperson comprising:
a processor coupled to and a memory storing instructions, which when executed by the processor, cause the processor to perform operations including:
automatically implementing a continuous tracking, by a location object server, of a plurality of reference locations of a plurality of traveling salespersons including a first traveling salesperson and a second traveling salesperson using a global position system (GPS) in communication with a plurality of devices including a device equipped with GPS sensor of the first traveling salesperson and a device equipped with GPS sensor of the second traveling salesperson;
identifying, using the location object server, location aware records relevant to the first traveling salesperson, proximate to a tracked reference location of the first traveling salesperson, wherein the location aware records specify at least account information of the traveling salespersons;
selecting a traveling salesperson to direct to visit an account based upon which traveling salesperson visited the account in connection with accomplishing a sales cycle milestone in a sales cycle relating to the account based on a specified distance from the tracked reference location of the first traveling salesperson in combination with pre-assigned heuristics stored in a selection and priority rules database that take into account stages at which one or more accounts are in a traveling salesperson's sale cycle applied to the tracked reference location of the first traveling salesperson and a tracked reference location of the second traveling salesperson, the pre-assigned heuristics including businesses that are accounts of the first and second traveling salespersons; and
receiving by the location object server over a network an interactive map provided by a location aware application hosted by a first database server and causing display, in a same page within a traveling salesperson's customer relationship management (CRM) application hosted by a second database server distinct from the first database server, of the interactive map overlaid with active symbols that present at least near real time information related to a particular account based on a previous sales effort made by the traveling salesperson automatically generated by the location object server that represent at least some of the identified location aware records based on the combination of the specified distance and the pre-assigned heuristics, thereby preventing the traveling salesperson from:

using the device equipped with GPS receiver to access the interactive map outside the CRM application;

using the device equipped with GPS receiver to access the account information via the CRM application; and based upon salesperson selection of an account, the selection received from the device of a salesperson, presenting information related to the selected account, including at least a selected account's contact directory, selected account's order history, interests expressed in products and services by the selected account, and time elapsed from a previous visit to the selected account.

18. The system of claim 17, further including instructions that cause the processor to discover other members of a traveling salesperson's sales team that:

have successfully worked with a selected prospect based on work history of other members of the traveling salesperson's sales team;

have previously worked with the selected prospect based on check-in history of other members of the traveling salesperson's sales team;

are available to coordinate a sales effort event based on electronic calendars of other members of the traveling salesperson's sales team; and have skills required for coordinating the sales effort event based on work profiles of other members of the traveling salesperson's sales team.

19. The system of claim 17, further including instructions that cause the processor to automatically determine routes to propose to the traveling salesperson for visiting multiple selected accounts based on the specified distance from a reference location and the pre-assigned heuristics.

20. The system of claim 17, further including instructions that cause the processor to filter data provided for presenting the interactive map of a traveling salesperson's accounts based on sales efforts, check-ins and locations of other members of a traveling salesperson's sales team.

* * * * *